United States Patent
Falcone et al.

(10) Patent No.: US 8,180,028 B1
(45) Date of Patent: May 15, 2012

(54) SYSTEM AND METHOD FOR CALLED PARTY CONTROLLED MESSAGE DELIVERY

(75) Inventors: Richard Falcone, Addison, TX (US); Randy Hoffman, Plano, TX (US); John J. Viola, Keller, TX (US); Michelle L. Mitchell, Dallas, TX (US); Robert Mudd, Keller, TX (US)

(73) Assignee: Securus Technologies, Inc., Dallas, TX (US)

( * ) Notice: Subject to any disclaimer, the term of this patent is extended or adjusted under 35 U.S.C. 154(b) by 517 days.

(21) Appl. No.: 12/365,770

(22) Filed: Feb. 4, 2009

Related U.S. Application Data

(62) Division of application No. 10/640,505, filed on Aug. 13, 2003, now Pat. No. 7,561,680.

(51) Int. Cl.
*H04M 1/64* (2006.01)
(52) U.S. Cl. ............ 379/88.25; 379/114.05; 379/115.02
(58) Field of Classification Search .... 379/88.22–88.25, 379/142.06, 207.13–207.15, 215.01
See application file for complete search history.

(56) References Cited

U.S. PATENT DOCUMENTS

| | | | |
|---|---|---|---|
| 4,791,640 A | 12/1988 | Sand | |
| 4,797,910 A | 1/1989 | Daudelin | |
| 5,181,237 A * | 1/1993 | Dowden et al. | 379/88.03 |
| 5,185,781 A | 2/1993 | Dowden et al. | |
| 5,210,789 A | 5/1993 | Jeffus et al. | |
| 5,355,403 A * | 10/1994 | Richardson et al. | 379/88.26 |
| 5,359,642 A | 10/1994 | Castro | |
| 5,359,643 A | 10/1994 | Gammino | |
| 5,463,677 A | 10/1995 | Bash et al. | |
| 5,483,581 A | 1/1996 | Hird et al. | |
| 5,504,805 A * | 4/1996 | Lee | 379/88.03 |
| 5,511,111 A * | 4/1996 | Serbetcioglu et al. | 379/88.01 |
| 5,517,555 A | 5/1996 | Amadon et al. | |
| 5,592,537 A | 1/1997 | Moen | |
| 5,615,408 A | 3/1997 | Johnson et al. | |
| 5,627,887 A | 5/1997 | Freedman | |
| 5,655,013 A | 8/1997 | Gainsboro | |
| 5,715,298 A | 2/1998 | Rogers | |

(Continued)

FOREIGN PATENT DOCUMENTS

EP  0 380 189  8/1990

(Continued)

OTHER PUBLICATIONS

U.S. Appl. No. 10/360,442, Falcone, et al.

(Continued)

*Primary Examiner* — Simon Sing
(74) *Attorney, Agent, or Firm* — Fogarty, L.L.C.

(57) ABSTRACT

Disclosed are systems and methods which allow a calling party to store messages for a called party even if the called party does not already have message storage facilities, provided the calling party and/or called party meet certain parameters. Delivery of the message is controlled by the called party and may require the called party to agree to pay for the message delivery service. In a further embodiment, a call processing system is operable to screen outgoing calls from various callers according to a first set of criteria and if a call is not completed to a called party a second set of criteria is used to determine if a message can be stored awaiting retrieval by the called party. If desired, a return message from a called party to a calling party can be stored.

23 Claims, 2 Drawing Sheets

U.S. PATENT DOCUMENTS

| | | | |
|---|---|---|---|
| 5,742,667 A | 4/1998 | Smith | |
| 5,748,711 A | 5/1998 | Scherer | |
| 5,787,150 A * | 7/1998 | Reiman et al. | 379/88.12 |
| 5,797,124 A | 8/1998 | Walsh et al. | |
| 5,825,857 A | 10/1998 | Reto et al. | |
| 5,832,068 A | 11/1998 | Smith | |
| 5,835,580 A | 11/1998 | Fraser | |
| 5,854,833 A | 12/1998 | Hogan et al. | |
| 5,859,900 A | 1/1999 | Bauer et al. | |
| 5,859,902 A | 1/1999 | Freedman | |
| 5,867,566 A | 2/1999 | Hogan et al. | |
| 5,870,723 A | 2/1999 | Pare, Jr. et al. | |
| 5,875,236 A | 2/1999 | Jankowitz et al. | |
| 5,894,511 A | 4/1999 | Jordan | |
| 5,923,733 A | 7/1999 | Binns et al. | |
| 5,937,044 A | 8/1999 | Kim | |
| 5,940,476 A * | 8/1999 | Morganstein et al. | 379/88.02 |
| 5,943,403 A | 8/1999 | Richardson, Jr. et al. | |
| 5,960,416 A | 9/1999 | Block | |
| 5,963,625 A | 10/1999 | Kawecki et al. | |
| 5,966,351 A | 10/1999 | Carleton et al. | |
| 6,029,062 A | 2/2000 | Hanson | |
| 6,031,898 A | 2/2000 | Jordan | |
| 6,035,025 A | 3/2000 | Hanson | |
| 6,044,247 A | 3/2000 | Taskett et al. | |
| 6,064,972 A | 5/2000 | Jankowitz et al. | |
| 6,078,892 A | 6/2000 | Anderson et al. | |
| 6,088,431 A | 7/2000 | LaDue | |
| 6,147,977 A | 11/2000 | Thro et al. | |
| 6,188,751 B1 | 2/2001 | Scherer | |
| 6,195,422 B1 | 2/2001 | Jones et al. | |
| 6,222,912 B1 | 4/2001 | Breuer | |
| 6,226,366 B1 | 5/2001 | Bala et al. | |
| 6,282,276 B1 | 8/2001 | Felger | |
| 6,292,543 B1 * | 9/2001 | Cannon et al. | 379/67.1 |
| 6,298,122 B1 * | 10/2001 | Horne | 379/93.09 |
| 6,307,926 B1 | 10/2001 | Barton et al. | |
| 6,327,345 B1 | 12/2001 | Jordan | |
| 6,330,546 B1 | 12/2001 | Gopinathan et al. | |
| 6,353,663 B1 | 3/2002 | Stevens et al. | |
| 6,373,930 B1 | 4/2002 | McConnell et al. | |
| 6,377,938 B1 | 4/2002 | Block et al. | |
| 6,389,117 B1 * | 5/2002 | Gross et al. | 379/88.23 |
| 6,393,113 B1 | 5/2002 | Karras | |
| 6,396,915 B1 | 5/2002 | Springer et al. | |
| 6,397,055 B1 | 5/2002 | McHenry et al. | |
| 6,405,028 B1 | 6/2002 | DePaola et al. | |
| 6,430,274 B1 | 8/2002 | Winstead et al. | |
| 6,434,378 B1 | 8/2002 | Fougnies | |
| 6,483,910 B1 | 11/2002 | Council | |
| 6,516,056 B1 | 2/2003 | Justice et al. | |
| 6,535,585 B1 * | 3/2003 | Hanson et al. | 379/88.12 |
| 6,560,323 B2 * | 5/2003 | Gainsboro | 379/188 |
| 6,611,583 B1 * | 8/2003 | Gainsboro | 379/188 |
| 6,625,260 B1 * | 9/2003 | Brockman et al. | 379/88.21 |
| 6,636,591 B1 | 10/2003 | Swope et al. | |
| 6,639,977 B1 | 10/2003 | Swope et al. | |
| 6,639,978 B2 | 10/2003 | Draizin et al. | |
| 6,658,393 B1 | 12/2003 | Basch et al. | |
| 6,665,380 B1 | 12/2003 | Cree et al. | |
| 6,668,045 B1 * | 12/2003 | Mow | 379/88.19 |
| 6,711,242 B2 * | 3/2004 | White et al. | 379/88.25 |
| 6,785,363 B2 * | 8/2004 | Culliss | 379/67.1 |
| 6,836,540 B2 | 12/2004 | Falcone et al. | |
| 6,947,532 B1 | 9/2005 | Marchand et al. | |
| 7,035,385 B2 | 4/2006 | Levine et al. | |
| 7,042,992 B1 | 5/2006 | Falcone et al. | |
| 7,075,919 B1 | 7/2006 | Wendt et al. | |
| 7,106,843 B1 | 9/2006 | Gainsboro et al. | |
| 7,130,390 B2 * | 10/2006 | Abburi | 379/88.17 |
| 7,158,621 B2 * | 1/2007 | Bayne | 379/114.13 |
| 7,203,301 B1 | 4/2007 | Mudd et al. | |
| 7,221,743 B2 | 5/2007 | Trinkel | |
| 7,254,612 B2 * | 8/2007 | Green et al. | 709/206 |
| 2001/0028705 A1 | 10/2001 | Adams et al. | |
| 2002/0025028 A1 | 2/2002 | Manto | |
| 2002/0106065 A1 | 8/2002 | Joyce et al. | |
| 2002/0115424 A1 | 8/2002 | Bagoren et al. | |
| 2002/0136374 A1 | 9/2002 | Fleischer, III et al. | |
| 2002/0147002 A1 | 10/2002 | Trop et al. | |
| 2002/0168060 A1 | 11/2002 | Huie | |
| 2002/0184103 A1 | 12/2002 | Shah et al. | |
| 2002/0194096 A1 | 12/2002 | Falcone et al. | |
| 2002/0194113 A1 | 12/2002 | Lof et al. | |
| 2003/0002639 A1 | 1/2003 | Huie | |
| 2003/0008634 A1 | 1/2003 | Laybourn et al. | |
| 2003/0046208 A1 | 3/2003 | Lubking et al. | |
| 2003/0112934 A1 | 6/2003 | Draizin et al. | |
| 2003/0112936 A1 | 6/2003 | Brown et al. | |
| 2003/0138084 A1 | 7/2003 | Lynam et al. | |
| 2003/0162526 A1 | 8/2003 | Ogman et al. | |
| 2003/0200182 A1 | 10/2003 | Truitt et al. | |
| 2004/0078328 A1 | 4/2004 | Talbert et al. | |

FOREIGN PATENT DOCUMENTS

WO  WO 98/32275  7/1998

OTHER PUBLICATIONS

Federal Prisoner Health Care Copayment Act of 2000, House of Representatives Report 106-851, 106th Congress 2d Session.
International Search Report issued Sep. 10, 2002 PCT/US 01/41744.
Microdevices Incorporated, "Message Desk, Functional Specification," Oct. 27, 1986, 8 pages.

* cited by examiner

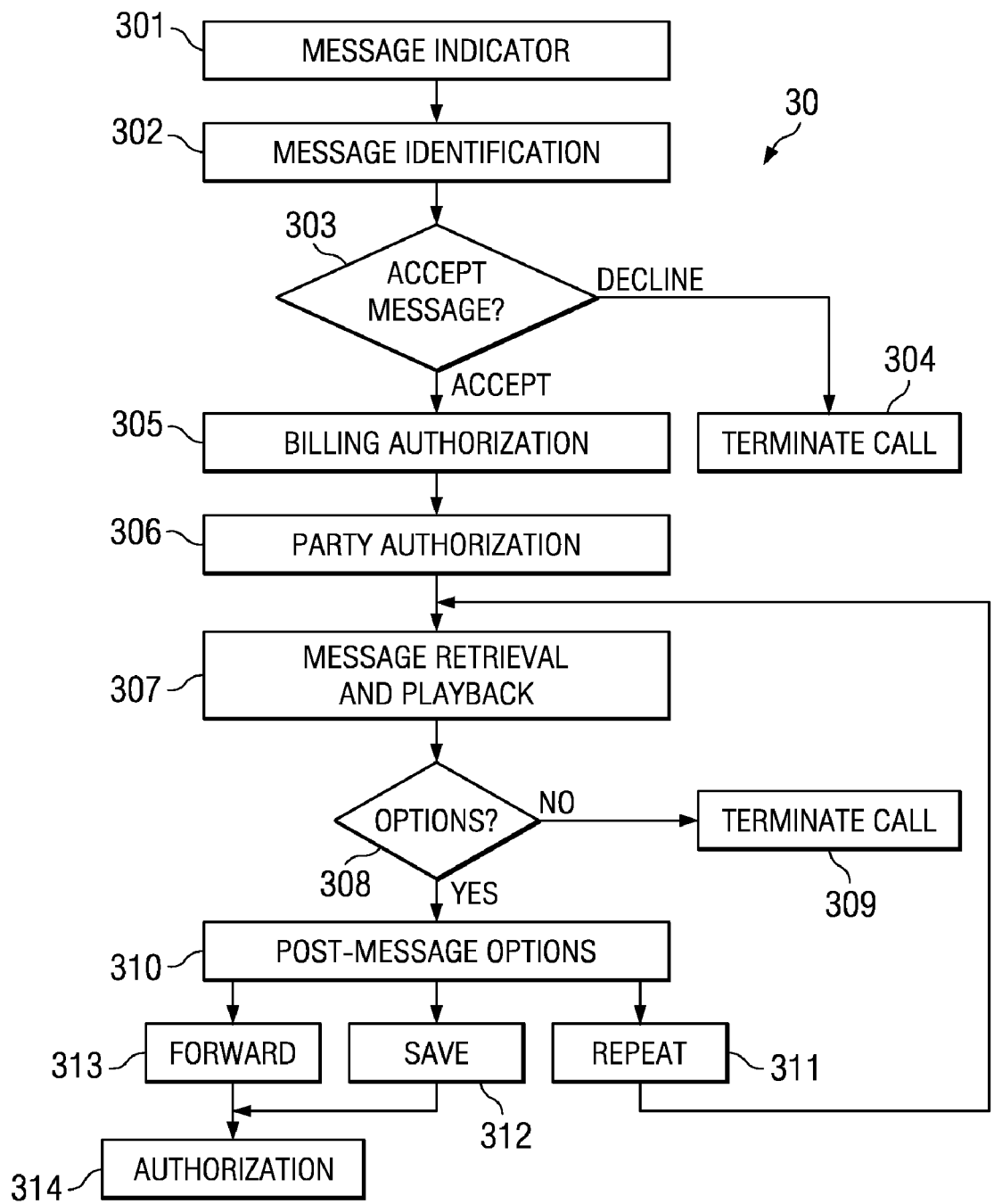

SYSTEM AND METHOD FOR CALLED PARTY CONTROLLED MESSAGE DELIVERY

CROSS REFERENCE TO RELATED APPLICATIONS

The present application is a divisional of U.S. patent application Ser. No. 10/640,505, filed Aug. 13, 2003 now U.S. Pat. No. 7,561,680, and entitled "System and Method for Called Party Controlled Message Delivery," the disclosure of which is hereby incorporated by reference herein in its entirety. The present application is related to co-pending and commonly assigned U.S. patent application Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/190,315 entitled "System and Methods for Offering a Service to a Party Associated with a Blocked Call," filed Jul. 3, 2002, Ser. No. 10/217,149 entitled "System and Method for Call Treatment," filed Aug. 12, 2002, Ser. No. 09/640,831 entitled "System and Method for Reverse Billing of a Telephone Call," filed Aug. 17, 2000, Ser. No. 10/360,248 entitled "System and Method for Account Establishment and Transaction Management Using Interrupt Messaging," filed Feb. 7, 2003, and Ser. No. 10/360,442 entitled "Systems and Methods for Transaction Authorization Determination," filed Feb. 7, 2003, the disclosures of which are all hereby incorporated herein by reference.

TECHNICAL FIELD

This invention relates to communication message delivery and more particularly to systems and methods for allowing a called party to pay for and/or control the delivery of stored messages and even more particularly to such systems and methods for use with outbound call processing systems.

BACKGROUND OF THE INVENTION

Currently, there are a number of call processing systems that allow calling parties to place communication connections to called parties only when the called party agrees to pay for the connection and only when the called party is deemed creditworthy. Many of these systems also impose other restrictions on such connections. For example, in the prison environment, when an inmate desires to place a call there might be a restriction on who the call can be placed to. There might be other restrictions, including time of day, number of prior calls, willingness on the part of the called party to receive (and if necessary, pay for) calls from the calling party. In many situations, such calls can only be placed to certain individuals and in other systems calls can be placed to anyone not on a restriction list for that inmate.

Restriction lists can, for example, include the names (phone numbers) of victims of the inmate, witnesses, law enforcement officers, court personnel, and the like. Because the called party must pay for many of these calls, those who have indicated by their past refusal to accept collect calls, or those with poor credit histories or which otherwise present an unacceptable risk to collection, may also be placed on the restricted list or otherwise cause the call attempt to be blocked. Such initial validation logic has been found by the present inventors to block about thirty percent of call attempts in a typical inmate calling scenario. Of the remaining call attempts, after the calling service provider has expended resources in validating the call attempt, a high percentage are not connected for one reason or another. Reasons include: the called party does not answer, the called line returns a busy signal, the attempt reaches an answering machine or answering service, or a problem exists with the called number (misdial, disconnected number, etcetera).

Under existing systems, when the calling party is prevented from actually connecting to the called party when placing a collect (reverse charge) call, there is no ability to leave messages for the called party. This is so even if the called party has an answering machine or answering service because such machines or services do not have the ability to accept charges for collect calls. Also, since the call processor handling the calling connection does not detect a voice ("live") connection, the call is automatically terminated (or in some systems, not actually fully completed) before a message can be left by the calling party.

BRIEF SUMMARY OF THE INVENTION

The present invention is directed to systems and methods which allow calls from a calling party to a called party, including calls which are not immediately completed (e.g., answered by a "live" person), to be stored for later delivery to the called party. This later delivery is preferably controlled by the called party. According to embodiments of the invention, the message is only available to the called party after the called party has agreed to pay for the message, perhaps including, if appropriate, the collect charges incurred by the calling party.

In a further embodiment, a call processing system is operable to screen outgoing calls from various callers according to a first set of criteria and if a call is not completed to a called party a second set of criteria is used to determine if a message should be stored for delivery to the called party.

In one embodiment, a system and method allows a calling party to store messages for a called party (or for a plurality of called parties) even if the called party does not already have message storage facilities, provided the calling party (parties) and/or called party meets certain parameters. In a further embodiment, stored undelivered messages from a calling party to a called party may be deleted when the calling party completes a connection to the called party. In a still further embodiment, provision is made for notification and/or returning a message to the calling party when the called party has retrieved the message.

In a still further embodiment, messages can be stored from a calling party to a called party even if the system would otherwise prevent the calling party from communicating directly with the called party.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 is a flow chart of an embodiment illustrating processing of a stored message.

DETAILED DESCRIPTION

Figure 1:
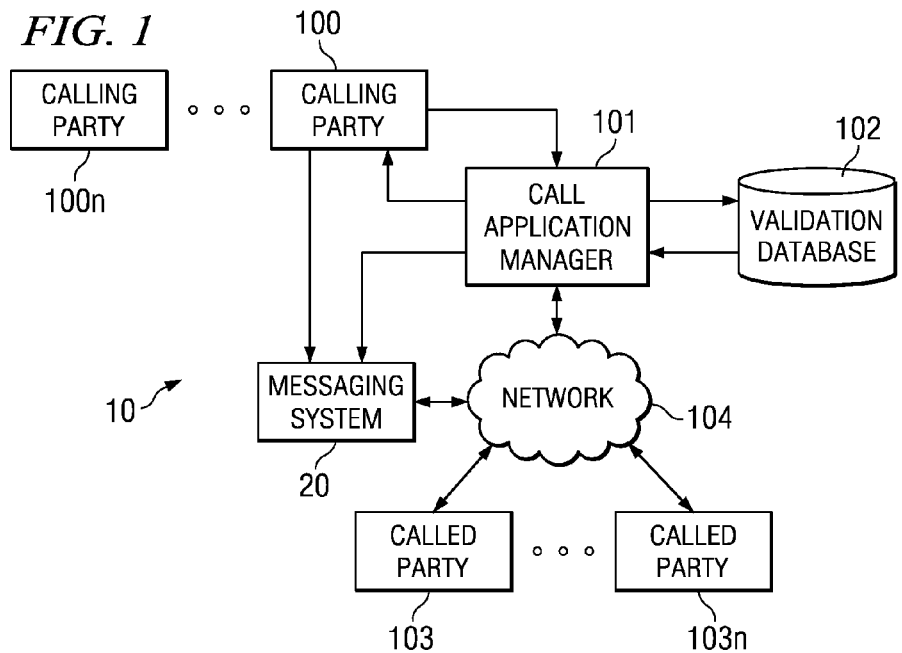
FIG. 1 is a block diagram of a call management system adapted for providing message delivery according to an embodiment of the present invention.

The present invention relates to a messaging system where a calling party is enabled to leave a message for a called party, such as when a live call to the called party cannot be completed. The called party can preferably control retrieval of a stored message, perhaps only after paying for the message. A messaging system operable according to embodiments of the invention may monitor subsequent calling activity of the calling and/or called party to control or adjust operation of message delivery. For example, if a calling party establishes a live call with the called party before a previously recorded message is delivered, the delivery of that message may be aborted. If a called party is determined to be present or available, such as through recognition of the called party's phone placing or receiving another call, message delivery may be attempted, such as through implementing interrupt messaging techniques with respect to the called party. Also, when a called party retrieves a message (or fails to retrieve a message) the calling party can be so notified the next time the calling party places a call. In addition, in some situations, the called party may record a return message for delivery to the calling party when the calling party next uses the telephone system. Details with respect to system operation recognizing when a call to a particular party has been completed and providing interrupt messaging techniques, as may be utilized according to embodiments of the present invention, are shown in the above referenced patent application entitled "System and Method for Account Establishment and Transaction Management Using Interrupt Messaging." Details with respect to system operation able to detect operational status and conditions with respect to a called party telephone, such as using the signaling system seven (SS7) intelligent network, and as may be utilized according to embodiments of the present invention, are shown in the above referenced patent application entitled "System and Method for Call Treatment."

Systems of the present invention may have application, for instance, in situations where the calling party is not authorized to make post-paid long distance calls and thus the call would likely be made collect (reverse charge where the called party pays for the connection). Embodiments of the present invention provide a message delivery vehicle when such call attempts are not completed. Further, systems of the present invention may have application where the calling party has a limited amount of time and opportunity for personal calls. Embodiments of the present invention provide a system such that even if the calling party fails to establish an active or "live" connection to the desired called party, a message could be left for the called party, even when the called party does not have message storage facilities. In either of the above situations, the called party could pay for the message and/or the original call costs resulting from the called party leaving the message in order to retrieve the message.

FIG. 1 illustrates messaging system 20 of one embodiment operable in call management system 10. Call management system 10 of the illustrated embodiment comprises a call processor system, shown here as call application manager 101, operable to facilitate various calling services, such as outbound calling, inbound calling, collect calling, pre-paid calling, post-paid calling, etcetera. Detail with respect to embodiments of call processing systems as may be utilized with messaging systems of the present invention are shown in the above referenced patent application entitled "Information Management and Movement System and Method." It should be appreciated that messaging system 20 of the illustrated embodiment may comprise program code operable upon processors of call application manager 101 and/or otherwise utilizing resources thereof. However, embodiments of the present invention provide a messaging system processor-based system platform, such as a computer having a central processing unit of the Intel PENTIUM family of processors, memory (e.g., random access memory (RAM), read only memory (ROM), disk storage (hard disk, optical disk, magnetic media, and/or the like), and suitable input/output devices (voice card, line interface, network interface, and/or the like), which is separate from that of a call application manager system, although some aspects of messaging system control algorithms may be present on the call application manager system to facilitate cooperation between the systems. Such embodiments may be useful in providing message delivery services in a call processing system in which a plurality of facilities having call application manager systems disposed thereat.

In operation of the call processing system shown in FIG. 1, a calling party, such as calling party 100, may initiate a call by picking up the phone and dialing a desired called party number, such as a number corresponding to called party 103 It should be appreciated that, although exemplary embodiments are described herein with reference to calling party and called party telephones (e.g., plain old telephone service (POTS) telephone terminals), the present invention is not limited to use with telephones. For example, embodiments of the present invention may record messages from and/or deliver messages to a wide variety of user devices, such as multimedia computers, video phones, cellular telephones, personal digital assistants (PDAs), etcetera. It should also be appreciated that, although embodiments are described herein with reference to calling party 100 placing a call to called party 103, embodiments of the present invention may provide calling services with respect to any number of calling and called parties (represented as calling parties 100-100n and called parties 103-103n in FIG. 1).

Call information, preferably including identification of calling party 100, may be provided to call application manager 101 for call processing. Call application manager 101 may require calling party 100 to enter data, such as may include a personal identification number and password, or may otherwise interact with the calling party in processing the call. For example, according to embodiments of the invention, the calling party may be enabled to signal the call processing system that a live connection is not presently desired and that message delivery service is to be invoked (e.g., a "time-shift" communication service). Accordingly, call application manager 101 may accept data from the calling party including a delay time for calling and a direction not to immediately place the call. In addition, in some embodiments the calling party may desire to be notified when a message is retrieved. In situations where this feature is an option, the calling party will enter that data as well. If the calling party desires for a message to be stored for a plurality of called parties, the calling information for each such called party is entered.

Call application manager 101 of the illustrated embodiment utilizes call data, preferably including the calling party personal identification number and the called party's phone number, with validation database 102 in determining if a particular call or other calling service is to be completed or otherwise allowed. Call application manager 101 in cooperation with validation database 102 may operate to determine whether or not calling party 100 is approved to call the called party (or called parties), whether the call presents an unacceptable risk for collection, whether an account associated with the called and/or calling party includes sufficient funds to pay for the call, whether a billing arrangement exists between the call processor service provider and an entity responsible for billing the called party (parties), and/or other determinations useful in concluding whether a particular call is to be completed. It should be appreciated, however, that in some situations all calls may be allowed whereas in other situations rigorous screening of calls may be performed.

Call application manager 101, in conjunction with validation database 102, may perform any number of checks prior to authorizing a calling connection or other calling service. For instance, the call processing system may operate to ascertain if the called party (parties) is likely to accept, and pay for, collect calls or calls billed to an account (prepaid or otherwise) paid for by the called party (parties). For example, call application manager 101 may determine whether historical information in validation database 102 indicates that the called party declined calls recently or that the called party has previously accepted calls. A partial list of such criteria includes: prior acceptance of collect calls from said calling party; prior acceptance of collect calls from any party; calling and/or called party appearing on a prestored list; calling and/or called party not appearing on a prestored list; calling and/or called party not falling within a certain category or ranking; calling and/or called party falling within a certain category or ranking; called party accepting previous messages from the calling party; and cost of the calling connection not exceeding a certain amount. Note that when there are multiple called parties for a single message these checks could, if desired, be made for all parties.

In an embodiment providing calling services with respect to a prison facility, call application manager 101 using validation database 102 may operate to determine whether or not the called phone number (numbers) is linked to the victim of the prisoner, the judge, a member of the jury, the state prosecutor, or the like. If the call is directed to such an unauthorized party, call application manager 101 may prevent the call from being completed. In such a prison embodiment, calls placed by calling party 100 are likely to be charged to the called party (e.g., collect, direct billed, local exchange carrier (LEC) billed, etcetera) or pre-paid (e.g., debited from an account associated with the calling party, debited from an account associated with the called party, debited from an account associated with a third party, etcetera). Accordingly, call application manager 101 using validation database 102 may operate to determine if sufficient monies are present or if risk of collecting monies for the calling service are unacceptable. Details with respect to making validation determinations with respect to a call, a calling party, and a called party are shown in the above referenced patent applications entitled "Optimizing Profitability in Business Transactions," "System and Method for Call Treatment," and "Systems and Methods for Transaction Authorization Determination."

It should be appreciated that validation database 102 of the illustrated embodiment may be utilized for making determinations other than whether a particular calling service should be allowed. Embodiments of the present invention utilize validation database 102 in making determinations with respect to various aspects of calling services. For example, in the aforementioned prison scenario embodiment, using validation database 102 may determine if a call is being placed to the calling party's attorney. If so, information may be provided to call application manager 101 instructing call application manager 101 not to record the conversation, in order to protect the attorney-client privilege.

After making a calling service validation determination using validation database 102, call application manager 101 according to one embodiment attempts to establish a communication connection with the called party, such as called party 103, via network 104. However, if the calling party had indicated that a live connection was not presently desired and that message delivery service was to be invoked, then according to embodiments of the invention no attempt would be made to complete a "live" call via network 104. Network 104 utilized according to embodiments of the present invention may comprise the public switched telephone network (PSTN), a private network, a data network, the Internet, a wireless network, and/or the like.

If the aforementioned call is made collect, when the called party is unavailable (does not answer live, e.g., a ring with no answer or the line is busy) the connection may be terminated without calling party 100 being allowed to communicate with anyone or anything associated with called party 103. This is so since a message typically cannot be left on the called party's answering machine without the charges being accepted by the called party. Under this situation, if called party 103 is unavailable, then calling party 100 may loses his/her window of time allocated for making phone calls.

It should be appreciated that a calling service provider associated with call processing system 10 may receive no revenues or reduced revenues for the aforementioned uncompleted call attempt. Moreover, the calling service provider may have expended appreciable resources and money, such as the cost of the connection from calling party 100 to call application manager 101, in making the call attempt. Accordingly, it may be advantageous to facilitate delivery of a message from the calling party to the called party, both to increase user satisfaction with the calling services provided and to increase the opportunity for collecting revenues by the calling service provider.

Facilitating such message delivery is likely to expose the calling service provider to additional expenditures of resources and money. However, embodiments of the present invention, including those described above, have already performed a call validation, thereby providing at least an initial qualification showing that one or more of the parties meet a first set of criteria, e.g., call validation criteria. Accordingly, calling situations presenting a very high risk of not being able to complete the service and/or collect monies for providing the service, such as where a called party is known not to accept calls from the calling party, may already be eliminated from the calls for which the additional expense of message delivery are considered by the first set of criteria.

However, providing message delivery services may present unacceptable risk of not being able to complete the service and/or collect monies for providing the service, and therefore continue to be uneconomical, to a calling service provider even where the aforementioned first set of criteria are met. Accordingly, embodiments of the present invention implement a second set of criteria, e.g., message delivery service criteria, to determine if a message delivery service is offered to a calling party, such as upon unsuccessful completion of a call. Information useful as message delivery service criteria, as may be stored in validation database 102 and utilized by call application manager 101 and/or messaging system 20, may include whether the called party is known to not accept calls from the calling party, whether the called party has not retrieved messages left in the past, a number of messages left by a calling party for delivery, a number of messages left for a called party for delivery, an expected or estimated cost of delivering a message to the called party, and/or the like.

Assuming called party 103 does not respond to the original calling connection (or the call was marked for a time-shift) and assuming the parties are otherwise determined to be eligible for call message delivery services, then call application manager 101 may inform calling party 100 that he/she has the opportunity to leave a message for called party 103. Calling party 100 then, if he/she desires, communicates with messaging system 20, perhaps via call application manager 101, in order to leave a message for called party 103. For example, call application manager 101 may initially record a message from calling party 100 and forward the message to messaging system 20 for storage and delivery. Alternatively, call application manager 101 may place calling party 100 in communication with messaging system 20 for recording of a message. After receiving a message, messaging system 20 preferably initiates communication with called party 103, such as making periodic call attempts to the called party, monitoring calls placed through call application manager 101 to identify a call answered by called party 103, communicating with network elements of network 104 (such as SS7 signaling control points (SCPs) to detect call activity at a phone associated with called party 103, and/or the like, to deliver the message.

It should be appreciated that the aforementioned recording of a message may include information in addition to or in the alternative to message content for the called party. For example, the calling party may indicate a preferred time for delivery of the message, an estimated time when the called party may be available for contact, a time by which the message is to be delivered or the delivery attempt aborted, a maximum charge to be incurred for message delivery, alternative contact information to utilize in initial or subsequent message delivery attempts, and/or the like. The alternative contact information might be a set of called numbers associated with the same called party or associated with several called parties, so that messages indicating that the calling party has stored a message can be delivered to many locations.

Embodiments of the invention accommodate payment for message delivery services by any of a number of parties (e.g., the calling party, the calling party, a third party, etcetera) and by any of a number of methods (e.g., by pre-paid account, post-paid account, LEC billing, direct billing, credit card, check by phone, mobile and electronic commerce techniques, etcetera). However, operation of embodiments in particular situations, such as where the original call attempt by calling party 100 was placed as a collect call and the calling party has not otherwise provided payment for the message delivery service, before messaging system 20 will deliver the message, called party 103 (or alternate called parties) must agree to pay the charges for delivery of the message, such as by authorizing billing for the retrieval of the message, providing credit or debit account information, etcetera. The cost to the called party for message delivery may include the cost of the call from calling party 100 to call application manager 101.

Although embodiments have been described above with reference to an inmate facility, it should be appreciated that the present invention is not limited to situations in which the calling party is disposed within such a facility and the called party is disposed without such a facility. Messages delivered according to embodiments of the present invention may be initiated external to a facility for which message delivery services are provided. Moreover, messages may be initiated and delivered within such a facility, if desired. For example, prison administration may utilize and embodiment of messaging system 20 to deliver messages to an inmate or a group of inmates, such as to notify the inmates of a change in visitation hours, to notify an inmate of his/her transfer to a different cell block, to notify an inmate of his/her hearing date, etcetera. Of course, the present invention is not limited to use with respect to such facilities and, therefore, may be implemented in any of a number of scenarios, including providing calling services to the public at large.

Figure 2:
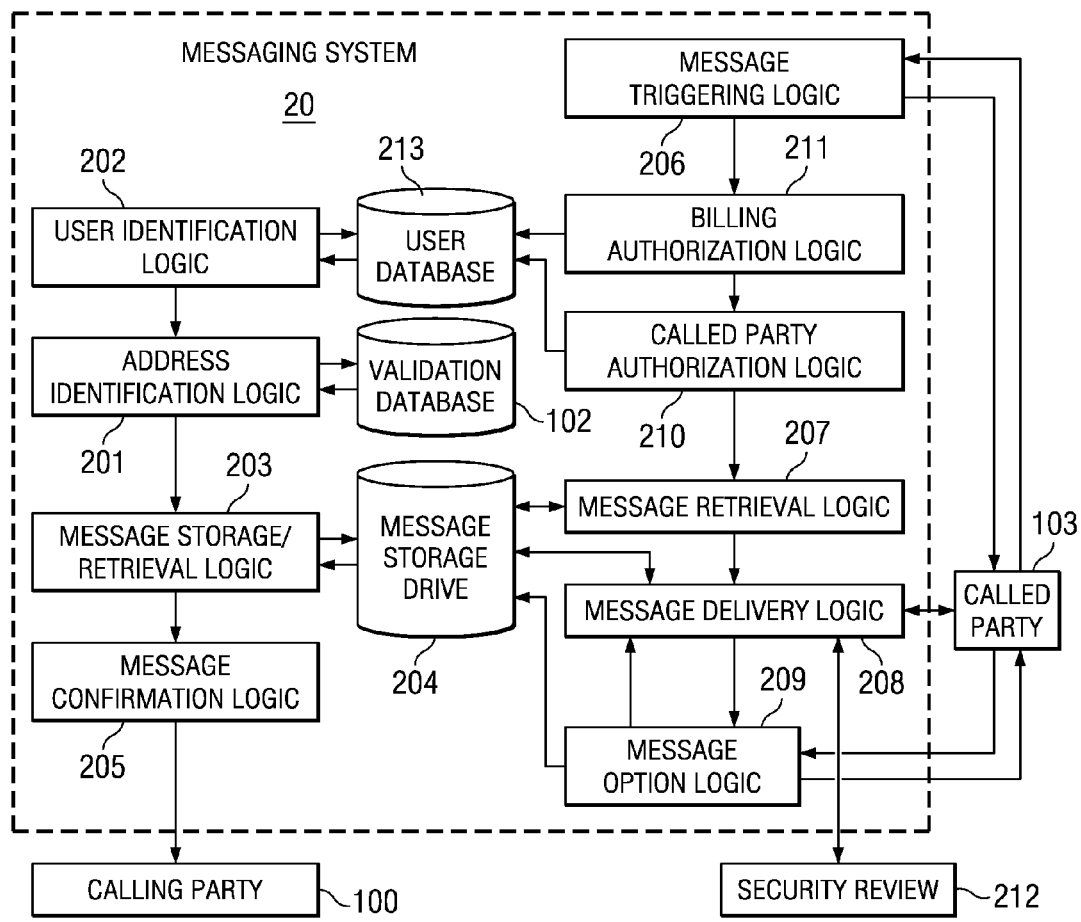
FIG. 2 is a block diagram of one embodiment of a message delivery system.

Directing attention to FIG. 2, further detail with respect to an embodiment of messaging system 20 is shown. It should be appreciated that, according to alternative embodiments of the present invention, various functional aspects shown in messaging system 20 of FIG. 2 may be provided elsewhere in call processing system 10, such as within call application manager 101.

Messaging system 20 of the embodiment of FIG. 2 includes user identification logic 210 which is operable to determine whether calling party 100 is authorized to leave messages and/or whether called party 103 is authorized to receive phone messages (e.g., analyzes message delivery service criteria). User identification logic 210 of embodiments of the invention communicates with user database 202 and/or validation database 102, for this purpose.

As discussed above, a variety of factors can be considered in determining whether message delivery services are to be provided including, but not limited to, the number of stored messages already stored for called party 103, the number of stored messages from calling party 100 associated with a particular called party 103, the number of previously obtained stored messages by called party 103, the time lapse since the last stored message directed to called party 103, the time lapse since the last stored message from calling party 100, a category or ranking (e.g., a decile rating as shown in the above referenced patent application entitled "Optimizing Profitability in Business Transactions") of called party 103, whether storage of messages is blocked for called party 103, and the availability of message storage privileges for calling party 100. In some situations, none of the above-identified factors are used and in some situations other factors are appropriate.

According to embodiments of the invention, techniques for controlling a calling party's ability to leave messages may utilize the calling party's identification and/or message delivery privileges (perhaps with respect to the particular called party or number called) are verified, such as through the use of a personal identification number (PIN), personal access number (PAN), biometric data (e.g., voice print, iris scan, retinal scan, finger print, etcetera), and/or the like to determine if a message is to be taken and/or delivered. Additionally or alternatively, embodiments of the invention may implement other techniques for controlling the ability of a calling party to leave messages, such as by controlling the number of outstanding (e.g., undelivered) messages a particular caller may leave, controlling the total number of message a particular caller may leave, and/or controlling the frequency (velocity) a calling party may leave messages. Such techniques may be particularly useful with respect to a calling party and/or called party associated with a controlled environment (e.g., prison) facility, such as to prevent harassing messages or messages spawned out of the party being idle.

Implementing the aforementioned message delivery criteria may be desirable because messaging system 20 is likely to have a finite amount of storage space and bandwidth for storing and delivering messages, and it does not make economic sense to accept messages for a called party who never claims them or when the called party does not have the credit necessary to pay for the message. Even where the called party is paying for the message delivery service, the aforementioned message delivery criteria may be implemented to provide such features as a "pay only if the message is delivered" business model, without the calling service provider taking unacceptable business risks.

When all applicable criterion are met, e.g., call validation criteria and/or message delivery criteria are met, calling party 100 may leave a message (voice, data or mixed) with messaging system 20 for delivery to called party 103. Accordingly, additional logic of messaging system 20 may be invoked after operation of user identification logic 210 as described above.

Calling party 100 may, under some situations, re-direct the message address or redirect the means of delivery for message delivery to called party 103 at a phone (or set of phones, e-mail addresses, etc.) other than one initially dialed when making a call attempt. This would be helpful, for example, when a calling party does not know for sure where a person is, or when the calling party needs assistance from any one of a number of people located at different locations, or having different phone numbers. Address identification logic 201 of one embodiment assists calling party 100 in determining the proper location for message delivery or in facilitating message delivery (e.g., implementing a message trigger for notifying the called party of the message). For instance, if calling party 100 had dialed the called party's land-line telephone and the connection was not established, the calling party might wish to have an e-mail sent to called party 103 that triggers the called party to access messaging system 20 to receive the message. Additionally or alternatively, address identification logic 201 may be utilized to provide information with respect to different message delivery points associated with the called party (or parties) to optimize the opportunity to deliver the message (e.g., provide a cell phone number for calling in addition to or in the alternative to the land-line telephone originally called).

Address identification logic 201 may operate to make a determination as to whether the re-directed address (or additional parties) meets the criteria for connection, such as by cooperating with user identification logic 202 (discussed above), accessing validation database 102, and/or accessing user database 213. For example, address information logic 201 may interact with validation database 102 to confirm that the address is on an approved list and/or that the address is not on a disapproved list. Functionality in addition to validating the address may be provided by address identification logic 201, such as to ensure that the message is stored, but not retrievable by anyone other than the called party where calling party 100 is a prisoner leaving a message for his/her attorney.

Assuming called party 103 is an approved message recipient, message storage logic 203 is invoked according to the illustrated embodiment, thereby allowing calling party 100 to leave a message for called party 103. Message storage/retrieval logic 203 preferably sends the message to message storage drive 204 which could be implemented with any storage device, including a hard-drive, flash memory, tape, storage area network (SAN), etcetera. After the message is stored in message storage drive 204, confirmation logic 205 preferably confirms to calling party 100 that the message was saved properly and that it will be delivered to called party 103, or to other identified parties.

Message storage/retrieval logic 203 may store information in addition to the content of the message to be delivered. For example, calling party 100 may be prompted to speak his/her name for announcement of the source of the message to called party 103 when notified of the pending message by messaging system 20. Such utterances may be obtained during calling party identification (e.g., step 202 discussed above) for use not only in identifying the calling party to the called party, but for biometric analysis (e.g., voice print). However, to avoid delivery of a surreptitious message in such a notification without payment for the message delivery service (e.g., the calling party states a very brief message rather than his/her name), embodiments of the present invention utilize such technology as speech-to-text in order to analyze the utterance and/or avoid delivery of a surreptitious message. Embodiments of the invention may utilize a trusted source of information (e.g., a database maintained by the message service provider) to obtain the calling party's identification for announcement to a called party. For example, a calling party's PIN, PAN, or biometric data may be utilized to retrieve the calling party's identity for announcement to the called party.

It should be appreciated that operation of message storage logic 203 of the present invention is not limited to facilitating the recording of a new message. For example, message storage/retrieval logic 203 could, if desired, abort delivery attempts and remove any previous undelivered messages between calling party 100 and called party 103. This message delivery abortion and removal may similarly occur when, on a subsequent call, a connection is made between calling party 100 and called party 103, or when the called party retrieves the message. Also, in some situations it may be desirable, for security reasons, to store messages for security review (or to review the messages prior to delivery). In such situations, storage/retrieval logic 203, in cooperation with storage drive 204, would control such security review. If desired, a separate section of memory or a separate memory, could be used. Message delivery logic 208 could deliver such messages for security review 212, if desired. This review would be by a third party, which could be live review or machine review.

Message triggering logic 206 of embodiments of the invention is used to inform the called party, such as called party 103, that a message is waiting in the system. According to one embodiment, message triggering logic 206 places a call to called party 103 to inform the called party that a message awaits. For example, the called party may be informed of the pending message through periodic call attempts placed to the called party by messaging system 20, e.g., placing a series of calls to the called party every 30 minutes until a call is answered or until a threshold or other terminating condition is reached (such as a predetermined period of time, a predetermined number of call attempts, the calling party successfully places a call to the called party, etcetera). Various calling patterns may be implemented according to the present invention, such as message triggering logic 206 repeatedly calling the called party once an hour between 8:00 A.M. and 10:00 P.M. for a number of days (e.g., three days) to notify the called party that a message awaits.

Additionally or alternatively, the called party may be informed of the pending message by messaging system 20 providing a signal that actuates a lamp, buzzer, special ring tone, special dial tone, or other indicator at the called station.

Embodiments of the present invention may provide for notification of a pending message through user devices in addition to or in the alternative to the called station. For example, in the situation where calling party 100 specifies that he/she wishes an e-mail be sent to called party 103, informing the called party of a message, (or where called party 103 has previously indicated a preference for e-mail notification) that e-mail preferably provide a phone number associated with messaging system 20 or other information which called party 103 could utilize to access the system to retrieve the message. Other pending message notification systems which may be utilized according to embodiments of the invention include cell phones (e.g., short message service (SMS)), pagers, PDAs, computers, and/or the like. For example, a particular called party may establish a prepaid account for delivery of messages (or for some other purpose, such as purchase of commissary items) and indicate a preferred method of notification (e.g., e-mail, text messaging, etcetera) which is utilized by messaging system 20 in delivering notification of pending messages. In one embodiment, the called party (or parties) are given a number to call (or a server to access) for message retrieval.

Message trigger logic 206 of embodiments of the invention supports inbound and/or outbound communications from/to a called party for notification and/or delivery of a pending message. For example, message trigger logic 206 may receive a call from called party 103 to query message trigger logic 206 as to whether any undelivered messages are pending. Additionally or alternatively, embodiments of the present invention may operate to monitor calling activity with respect to the called party (or the calling party for notification of message retrieval) and implement interrupt messaging, including those shown and described in the above referenced patent application entitled "System and Method for Account Establishment and Transaction Management Using Interrupt Messaging," to notify a called (or calling) party of a message (or of the delivery of a message), and/or to establish a connection for delivering a message. For example, called party 103 may place or receive a call through call application manger 101 to/from calling party 100n (FIG. 1), messaging system 20 may recognize that called party 103 has a message awaiting delivery and implement interrupt messaging to notify called party 103 of the message and/or deliver the message to called party 103. Message trigger logic 206 of embodiments of the present invention may operate to recognize calling activity with respect to the called party independent of call application manager 101 for use in determining when the called party (or if appropriate, the calling party) may be notified of a pending message. For example, embodiments of message trigger logic 206 implement intelligent network queries, including those shown and described in the above referenced patent entitled "System and Method for Call Treatment," in determining when a called party is available to receive notification of a pending message.

It should be appreciated that message triggering logic 206 of embodiments of the present invention is not limited to message notification and delivery functions. For example, message triggering logic 206 may provide information to user database 202, such as number of failed attempts at contacting the called party, address at which the called party was successfully contacted, etcetera, for later use, such as by user identification logic 210 and/or address identification logic 201.

After called party 103 (or other identified parties) responds to the pending message notification or the pending message notification is otherwise delivered to the called party, billing authorization logic 211 of the illustrated embodiment may be invoked to ensure that payment for the message delivery service is properly addressed before the message is actually delivered to called party 103. For example, where calling party 100 has provided account information or has otherwise agreed to pay for the message delivery service, billing authorization logic 211 may deduct the cost of the message delivery service from the appropriate account (e.g., in a "pay only if the message is delivered" business model) or confirm that payment has been made. However, where the calling party has not made arrangements for payment of the message delivery service, such as in a collect calling scenario, embodiments of the invention utilize billing authorization logic 211 to have the called party (or alternate parties) authorize payment for the message delivery service. For example, called party 103 may authorize LEC billing (much like a traditional collect call), may authorize direct billing, may provide credit or debit account information, may provide check by phone, etcetera, through interaction with billing authorization logic 211. Additionally or alternatively, embodiments of the present invention utilize billing authorization logic 211 to establish an account for payment for message delivery services, both immediately and in the future. Details with respect to automated systems for establishing such accounts dynamically are provided in the above referenced patent application entitled "System and Method for Account Establishment and Transaction Management Using Interrupt Messaging."

It should be appreciated that the aforementioned accounts which may be utilized in paying for message delivery services need not be specifically created for use with message delivery services. For example, calling party 100 may have a commissary account, such as provided by transaction management systems disclosed in the above referenced patent application entitled "Information Management and Movement System and Method," which may be identified and debited for messaging services according to the present invention.

Billing authorization logic 211 preferably determines the proper format for billing and, perhaps in cooperation with called party authorization logic 210, whether or not the called party is approved to use the selected payment method. For example, once the called party approves a charge, such as to be LEC billed or direct billed, called party authorization logic 210 may operate to ensure that the called party meets an acceptable amount of risk on payment. Where the called party authorizes more immediate payment, such as a charge to a credit, debit, or pre-paid account, called party authorization logic 210 may operate to debit the appropriate account. The payment options can be made call specific so that they depend upon a particular called party credit rating, which, in turn, depends upon credit risk, call type, time of storage, etc.

It should be appreciated that operation of billing authorization logic 211 and called party authorization logic 210 is not limited to the acceptance and processing of billing authorization. For example, billing authorization logic 211 and/or called party authorization logic 210 may provide information to user database 202, such as credit scoring (decile) information, a type of account used to pay for message delivery services, etcetera, for later use, such as by user identification logic 210 and/or address identification logic 201.

Once payment for the message delivery service is confirmed or otherwise accounted for by billing authorization logic 211 and called party authorization logic 210 of one embodiment, the message may then preferably be retrieved by message retrieval logic 207. For example, message retrieval logic 207 may communicate with message storage drive 204 to retrieve the message recorded by calling party 100 and/or ancillary data associated therewith. The message is preferably passed on to message delivery logic 208 for delivery to called party 103.

It should be appreciated that the connection between messaging system 20 and called party 103 may be established by messaging system 20, e.g., messaging triggering logic 206 contacting the called party to notify the called party of a pending message or message delivery logic 208 contacting the called party to delivery the retrieved message. Alternatively, the connection between messaging system 20 and called party 103 may not be established by messaging system 20, e.g., calling party 103 calling messaging system 20 to retrieve messages. Additionally or alternatively, embodiments of the present invention may operate to monitor calling activity with respect to the called party and implement interrupt messaging, including those shown and described in the above referenced patent application entitled "System and Method for Account Establishment and Transaction Management Using Interrupt Messaging," to establish a connection for delivering a message, as discussed above.

After receiving the message, the called party may be given several options regarding the message, such as may be presented by message option logic 209. For instance, message option logic 209 could, at the called party's request, repeat the message, save the message, forward the message, record a message to be returned to the calling party, and the like. Depending on the option chosen, other hardware or software not shown in FIG. 2 may be invoked. For instance, messaging system 20 could be set up so that repeating the message carries no additional charge. However, saving the message, or recording a return message, might require an additional fee. If so, then additional billing authorization logic might be utilized or billing authorization logic 211 and/or called party authorization logic 210 may be invoked by message option logic 209. Further, if the message were to be forwarded, billing authorization logic 211 and to ensure that address authorization logic 201 might be adapted to ensure that the message would be paid for and to ensure that the forwarded party is authorized to receive messages from the calling and called parties. Depending on the option chosen, logic might be invoked to ensure the forwarded message was going to an authorized party, as is described above with respect to the initial recipient of the message. If a return message is desired, it might be appropriate to determine if such message is appropriate for such a calling party. In the context of this patent, an "authorized" party can be a party specifically named, or could be any party not on a restricted list, or parties that are within (or outside) certain categories. For example, law enforcement offices might be a restricted category. The list of "authorized" parties can be different depending upon the identity of the party leaving the original message. The system could, if desired, inform the forwarding party of a restriction and request another number.

FIG. 3 shows flowchart 30 illustrating one example of the operation of messaging system 20 from the perspective of a called party, such as calling party 103, having a message waiting in the system. According to the embodiment of FIG. 3, called party 103, or any other party being notified of a stored message, interacts with messaging system 20 to identify him/herself and, perhaps, authorize payment for the message delivery service. Further, as discussed, the called party may have several options relating to the message after retrieval.

Initially, at step 301 a message indicator conveys to called party 103 that a message awaits retrieval. As discussed above, the notification to the called party can be a preset signal, a call placed to the called party, an indicator specified by calling party 100 when the message was stored in messaging system 20, etcetera. For example, calling party 100 could have specified an e-mail address for the called party and, therefore, message indicator step 301 may send an e-mail to inform the called party that a message is available. Alternatively, the called party could receive a phone call at message indicator step 301 informing the called party that a message from calling party 100 is available.

At step 302 messaging system 20 may communicate to the called party the identity of the message sender, the duration of the message, the cost of the message, and the like. At step 303 the called party has the option to accept or decline delivery of the message. If the called party declines delivery of the message at step 303, then, from the called party's perspective, messaging system 20 would terminate (e.g., the phone connection would be hung-up or the e-mail deleted) at step 304. Messaging system 20 may delete the message from the storage facility when delivery is declined by the called party. With e-mail notification, the message could be deleted after a preset period of time without response.

If the called party chooses to accept delivery of the message at step 303, then step 305 of the illustrated embodiment invokes billing authorization functionality to begin processing the payment options. If the called party was notified of the message via telephone and the message delivery service has not been paid for by the calling party, for example, the called party may receive voice prompts regarding how the message delivery service is to be paid for. Alternatively, if the called party was notified of the message via e-mail, the called party may access the system via telephone, identify him/herself and then proceed to billing authorization step 305. Of course, there is no limitation according to the present invention that messages be delivered via telephone. Accordingly, the called party could access messaging system 20 via a data network, such as the Internet, etcetera.

It should be appreciated that the called party's options with respect to a message are not limited to accepting or declining delivery of a message. For example, the called party, whether accepting the message or declining the message, may be provided options with respect to providing feedback regarding the message being undesired (e.g., harassing). According to one embodiment, a called party is provided an option to block future attempts at delivery of similar messages, e.g., blocking messages from the same called party (such as may be identified by calling number, a facility from which the message was taken, calling party PIN or PAN, calling party voice print, etcetera), blocking messages from the same facility, blocking messages having the same or similar content (such as may be recognized by speech to text and/or text analysis), blocking all messages from the message delivery system, etcetera. Such called party feedback may additionally or alternatively provide reporting of the situation with respect to the message to others, such as a facility for which the calling services are provided and/or a service provider of the calling services. Such reports may include such information as the name of the calling party, the name of the called party, the dialed number, the calling party's recorded utterances (e.g., name), and/or the like. Accordingly, a called party may be enabled to stop and/or report harassing messages with little effort. Message delivery systems of embodiments of the present invention may be configurable to allow an operator thereof to configure such options and/or the extent and recipient of the aforementioned reports on such basis as the particular facility, the particular calling party, the particular called party, the type of message, etcetera.

Regardless of the means chosen to retrieve the message, the step 305 of the illustrated embodiment confirms that payment for the message delivery service is provided for, whether the called party enters information for billing, the calling party provided information for billing, etcetera. For instance, the called party could have the cost of the message charged to their telephone bill or credit card (if the called party is credit approved). Alternatively, a frequent user of the message recording system could have a personal account set up where the system bills them individually, or a debit account, or a prepaid account could be used.

Once billing authorization has been confirmed at step 305, the illustrated embodiment proceeds to step 307 wherein party authorization is provided to determine whether or not the called party is approved to use the selected payment method and, if so, to deduct the appropriate charges for the message delivery service. Thereafter, the message may be retrieved and played or delivered electronically to the called party at step 307.

When delivery of the message if finished, step 308 may determine if further messaging options are to be presented to the called party. If no further messaging options are to be presented to the called party, processing according to the illustrated embodiment proceeds to step 309 wherein communication with the called party is terminated. However, if further messaging options are to be presented to the called party, processing according to the illustrated embodiment proceeds to step 310 wherein the called party is allowed to choose from a variety of options. It should be appreciated that some, or all, of the messaging options could require a fee. For instance, repeating a message could be a free service, while forwarding a message or sending a return message could have a charge associated therewith.

One option which may be available via step 310 is the repeat message option of step 311. Proceeding to repeat message step 311 from message options step 310 returns processing to message playback step 307.

Another option which may be available via step 310 is the save message option of step 312. Proceeding to save message step 312 preferably results in the message being marked as saved and/or copied to a long term storage archive. Accordingly, the called party would have the option to save the message on the storage facility and then be able to later retrieve the message. In some embodiments this may include billing and/or party authorization step 314 (which may operate as described above with respect to steps 305 and 306). For instance, the called party might enter information regarding the billing method and whether or not a personal account was desired.

Another option which may be available via step 310 is the forward message option of step 313. Proceeding to forward message step 313 preferably results in the message being scheduled for delivery to yet another party. When the forward message option is selected, processing may proceed to step 314 wherein billing and/or party authorization (such as described above with respect to steps 305 and 306) is performed. Additionally or alternatively, step 314 may operate to insure that the called party was not forwarding the message to an unauthorized party.

If available, and if chosen by the called party, a return message is recorded by the called party and stored in, for example, storage drive 204 via delivery logic 208. Once stored, such a message is delivered to the calling party, via message storage/retrieval logic 203, either when the calling party next uses the system or by notification to the calling party and retrieval by the calling party as is discussed herein for messages going to called parties.

Note that while the description discusses a called party, in actuality that called party could be a telephone station, either wireline or wireless, answerable by any person. Or it could be the identity of a specific individual such that the telephone network would find the individual and the call placed to a telephone station in proximity to that individual. Also note that the stored message could be video, text, audio or a combination thereof. The structure for controlling the operation described herein could be hardware, software, or a combination thereof and in practice it is anticipated that the message system described herein will be combined with a call processing platform of the type supplied by Evercom Systems, Inc., the assignee of the present invention, and known as CALL APPLICATION MANAGER.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

While the illustrative embodiment discussed above is described for use in a prison environment, the concepts could be used in many situations for allowing a calling party to store a message for a called party where the called party can retrieve the message at the leisure of the called party, provided only that the called party is willing to pay for the delivery of the message. One example of such a system is a relative calling home from the armed services where the calling party only has a limited time to place the call and may or may not have the ability to pay for the call. In some situations, the system could be used for time-shifting the call such that it does not ring the called number for, say, six hours after the original call was placed.

What is claimed is:

1. A method comprising:
    performing, via a computer system,
    identifying a collect call placed by a calling party to a called party;
    in response to the collect call being blocked, allowing the calling party to record a voice message for the called party in response to a determination that the called party has previously accepted at least one collect call from the calling party, the voice message delivered to the called party in response to a called party's agreement to pay for the voice message;
    in response to the voice message being delivered to the called party, allowing the called party to record a return voice message for delivery to the calling party; and
    in response to the called party recording the return voice message, causing the calling party to be informed that the return voice message is available to the calling party.

2. The method of claim 1, wherein the collect call is blocked in response to the calling party being prohibited from communicating directly with the called party.

3. The method of claim 1, wherein the calling party is allowed to record the voice message if the called party has previously accepted at least one communication from the calling party.

4. The method of claim 1, wherein the calling party is allowed to record the voice message if the called party has previously accepted at least one communication from another calling party.

5. The method of claim 1, wherein the calling party is allowed to record the voice message if a cost of the collect call does not exceed a certain amount.

6. The method of claim 1, wherein the calling party is allowed to record the voice message if an identity of the calling party is validated.

7. The method of claim 6, wherein validating the identity of the calling party comprises employing biometric comparison configured to analyze a biometric sample provided by the calling party.

8. The method of claim 1, wherein the called party's agreement to pay for the voice message includes a called party's agreement to pay a reverse charge associated with the collect call.

9. The method of claim 1, wherein the called party's agreement to pay for the voice message includes at least one of a credit card payment, a prepaid arrangement, or an immediate payment.

10. The method of claim 1, wherein at least one of the calling party or the called party is within a prison facility.

11. The method of claim 10, further comprising performing, via the computer system, allowing prison administration to review at least one of the voice message or the return voice message.

12. A method comprising:
performing, via a computer system,
identifying a collect call placed by a calling party to a called party;
in response to the collect call being blocked, allowing the calling party to record a voice message for the called party, in response to a determination that the called party has previously accepted at least one collect call from another calling party;
the voice message delivered to the called party in response to a called party's agreement to pay for the voice message;
in response to the voice message being delivered to the called party, allowing the called party to record a return voice message for delivery to the calling party; and
in response to the called party recording the return voice message, causing the calling party to be informed that the return voice message is available to the calling party.

13. A tangible computer-readable storage medium including program instructions stored thereon that, upon execution by a computer system, cause the computer system to:
block an attempt by a calling party to place a collect call to a called party in response to a determination that the calling party is forbidden from communicating directly with the called party;
allow the calling party to record a voice message for the called party if the called party has previously accepted at least one collect call, the voice message delivered to the called party in response to a called party's agreement to pay for the voice message;
in response to the voice message being delivered to the called party, allow the called party to record a return voice message for delivery to the calling party; and
in response to the called party recording the return voice message, inform the calling party that the return voice message is available to the calling party.

14. The tangible computer-readable storage medium of claim 13, wherein to allow the calling party to record the voice message, the program instructions, upon execution by the computer system, further cause the computer system to allow the calling party to record the voice message in response to a determination that a cost of the collect call does not exceed a certain amount.

15. The tangible computer-readable storage medium of claim 13, wherein the called party's agreement to pay for the voice message includes a called party's agreement to pay a reverse charge associated with the collect call.

16. The tangible computer-readable storage medium of claim 13, wherein the program instructions, upon execution by the computer system, further cause the computer system to allow a third party to review at least one of the voice message or the return voice message.

17. A tangible computer-readable storage medium including program instructions stored thereon that, upon execution by a computer system, cause the computer system to:
block an attempt by a calling party to place a collect call to a called party in response to a determination that the calling party is forbidden from communicating directly with the called party;
allow the calling party to record a voice message for the called party if the called party has previously accepted at least one voice message, the voice message delivered to the called party in response to a called party's agreement to pay for the voice message;
in response to the voice message being delivered to the called party, allow the called party to record a return voice message for delivery to the calling party; and
in response to the called party recording the return voice message, inform the calling party that the return voice message is available to the calling party.

18. A system comprising:
a processor; and
a memory coupled to the processor, the memory configured to store program instructions that, upon execution by the processor, cause the system to:
identify an attempt by a calling party to place a collect call to a called party;
block the attempt in response to the calling party being prohibited from communicating directly with the called party; and
allow the calling party to record a voice message for the called party in response to a determination that the called party has previously accepted at least one collect call, the voice message delivered to the called party in response to a called party's agreement to pay for the voice message.

19. The system of claim 18, wherein to allow the calling party to record the voice message, the program instructions, upon execution by the processor, further cause the system to allow the calling party to record the voice message in response to a determination that the called party has previously accepted at least one communication.

20. The system of claim 18, wherein to allow the calling party to record the voice message, the program instructions, upon execution by the processor, further cause the system to allow the calling party to record the voice message in response to a determination that a cost of the collect call does not exceed a certain amount.

21. The system of claim 18, wherein the called party's agreement to pay for the voice message includes a called party's agreement to a pay reverse charge associated with the collect call.

22. The system of claim 18, wherein the program instructions, upon execution by the processor, further cause the system to:

in response to the voice message being delivered to the called party, allow the called party to record a return voice message for delivery to the calling party; and in response to the called party recording the return voice message, inform the calling party that the return voice message is available to the calling party.

23. The system of claim 22, wherein the program instructions, upon execution by the processor, further cause the system to allow a third party to review at least one of the voice message or the return voice message.

* * * * *